H. JONES.
FOOT SCRAPER.
APPLICATION FILED DEC. 20, 1910.
1,022,950.
Patented Apr. 9, 1912.
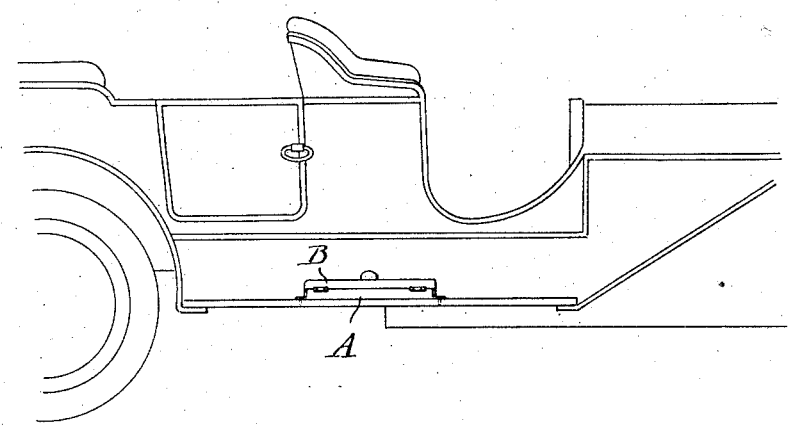
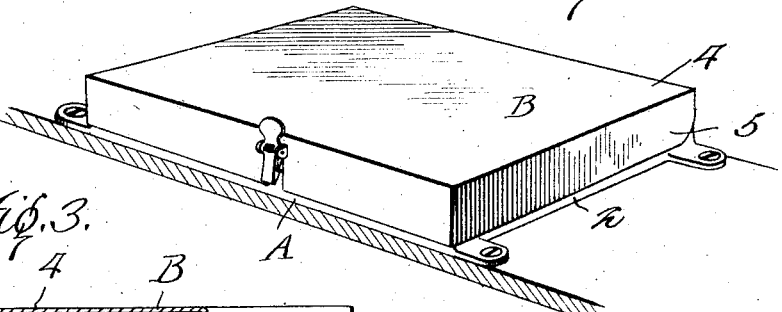
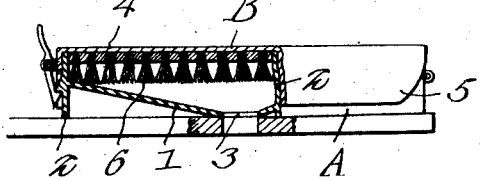
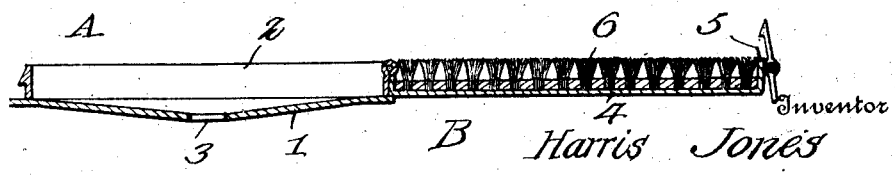
Inventor
Harris Jones
By Victor J. Evans
Attorney
Witnesses
Hugh Hett
V. B. Hillyard

UNITED STATES PATENT OFFICE.

HARRIS JONES, OF WATERTOWN, NEW YORK.

FOOT-SCRAPER.

1,022,950.  Specification of Letters Patent.   Patented Apr. 9, 1912.

Application filed December 20, 1910. Serial No. 598,290.

*To all whom it may concern:*

Be it known that I, HARRIS JONES, a citizen of the United States, residing at Watertown, in the county of Jefferson and State of New York, have invented new and useful Improvements in Foot-Scrapers, of which the following is a specification.

The present invention provides means for removing mud and other foreign matter that may adhere to the shoe and in its specific structure the device consists of an attachment to be fitted to the running board of an automobile or like vehicle, so that the person may remove mud, snow, and the like from the foot prior to entering the vehicle and thereby prevent soiling the floor covering or accumulating dust, moisture and the like therein.

The attachment comprises scrapers, a shallow receptacle for receiving the material removed from the foot, and a brush, the latter acting as a mat or rug for removing any loose particles and thereby prevent soiling the most delicate floor covering.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a side view of part of an automobile provided with a foot scraper embodying the invention. Fig. 2 is a perspective view of the foot scraper, showing the cover closed and the device applied to the running board of a vehicle. Fig. 3 is an end view, parts of the receptacle and cover and the running board to which the device is applied being broken away. Fig. 4 is a transverse section of a modification in which the running board constitutes the bottom of the receptacle.

Corresponding and like parts are referred to in the following description, and indicated in all the views of the drawing, by the same reference characters.

The device comprises a shallow receptacle A and a cover B, the receptacle being relatively fixed and the cover hinged to the receptacle so as to swing outward into the plane thereof. The parts are of substantial construction and the hinge connection between them of such formation as to admit of the parts bordering upon the hinge abutting when the cover is swung open to hold the same in the plane of the receptacle. The receptacle consists of a bottom 1 and a rim 2, the latter projecting upwardly from the bottom and constituting scrapers to engage with the shoe to remove mud and other foreign matter that may adhere thereto. The bottom 1 has a central opening 3 and is depressed and slopes from its outer edges to the opening so as to readily discharge the matter received therein when cleaning the feet. When the device is constructed to be fitted to the running boards of automobiles in use or upon the market the rim 2 and bottom 1 are formed together, but when the device is to be adapted to running boards to be constructed a portion of the running board is constructed to form the bottom 1, the rim 2 being bolted or otherwise secured to the running board. When adapting the invention to running boards to be constructed a portion of the running board is depressed and an opening is formed in the center of the depressed part, said opening providing a discharge and the depressed portion of the running board constituting the bottom of the receptacle.

The cover B comprises a top 4 and a rim 5. A mat or brush 6 is fitted within the cover and serves to remove dust or like foreign matter from the feet. The cover when closed upon the receptacle is secured by means of a spring catch or other fastening such as commonly provided for box covers.

The device may be finished in any manner and is usually constructed of sheet steel pressed into desired form.

The device may be of any size or finish to agree with the machine or vehicle to which fitted. The cover is arranged to swing outwardly from the running board and the parts are of sufficient strength to withstand the strain to which they will be subjected in ordinary use.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A running board for vehicles having a portion depressed and having an opening in the depressed portion, and a rim secured to the depressed part of the running board and forming therewith a shallow receptacle.

2. A running board for vehicles having a portion depressed and having an opening in the depressed portion, a rim secured to the depressed part of the running board and forming therewith a shallow receptacle, and a cover hinged to the rim and adapted to swing outward into approximately the plane of the running board, said cover adapted to receive a brush.

In testimony whereof I affix my signature in presence of two witnesses.

HARRIS JONES.

Witnesses:
 GEORGE HAAG,
 WILLIAM H. LEE.